United States Patent [19]

Ferrarin

[11] Patent Number: 5,730,670
[45] Date of Patent: Mar. 24, 1998

[54] BICYCLE TRANSMISSION ASSEMBLY

[75] Inventor: Francis Ferrarin, Milan, Italy

[73] Assignee: Idit International Design N.V., Netherlands Antilles

[21] Appl. No.: 706,457

[22] Filed: Sep. 4, 1996

[30] Foreign Application Priority Data

Sep. 6, 1995 [IT] Italy ................... MI95A1874

[51] Int. Cl.⁶ ........................................ F16H 7/06
[52] U.S. Cl. ................................. 474/79; 474/80
[58] Field of Search ....................... 474/78, 79, 80, 474/82, 85, 88; 74/594.7; 280/231, 278, 287

[56] References Cited

U.S. PATENT DOCUMENTS

| | | | |
|---|---|---|---|
| 4,681,557 | 7/1987 | Hillman | 474/119 |
| 4,919,644 | 4/1990 | Carlyle | 474/80 |
| 4,995,626 | 2/1991 | Montague | 280/231 |
| 5,186,482 | 2/1993 | Sapper | 280/278 |

FOREIGN PATENT DOCUMENTS

| | | |
|---|---|---|
| 0 343 751 | 11/1989 | European Pat. Off. . |
| 0 505 598 | 9/1992 | European Pat. Off. . |

*Primary Examiner*—Roger J. Schoeppel
*Attorney, Agent, or Firm*—Jacobson & Johnson

[57] ABSTRACT

Transmission assembly, particularly for bicycles or the like, having an inside box-like body, a first chain ring associated with a pedal crank shaft and connected to a pinion by a first chain, and a second chain ring associated with a second shaft and rotating rigidly with said pinion. A second chain is associated with the second chain ring and is adapted to transmit the motion to a gearshift assembly constituted by a plurality of gears that can be selectively associated with the second chain by a derailleur. The gearshift assembly is rigidly coupled to a hub that supports a wheel in a cantilevered manner outside the box-like body.

10 Claims, 4 Drawing Sheets

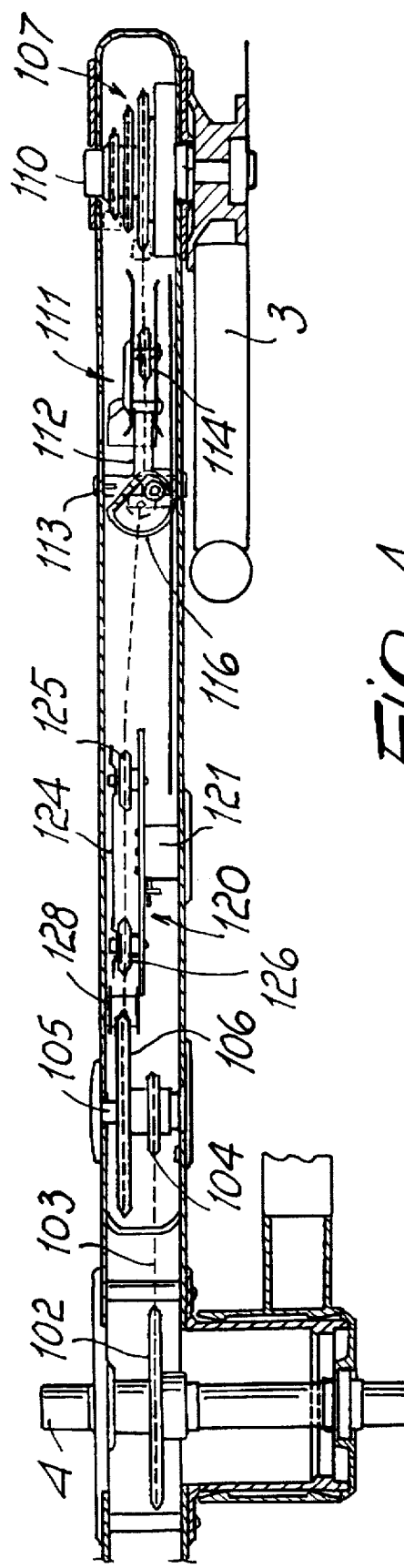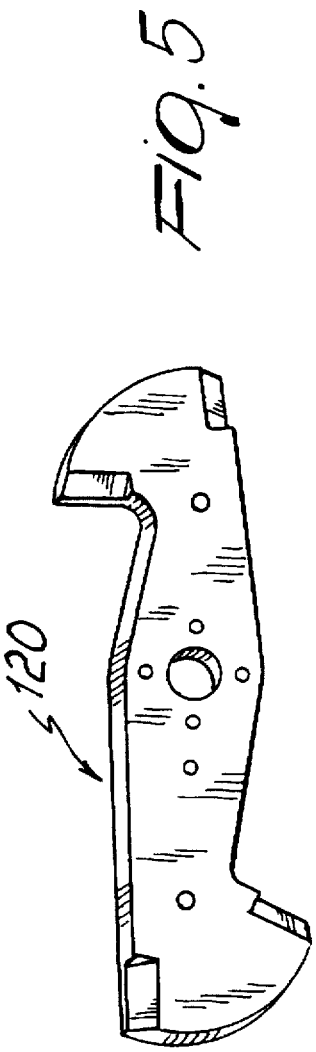

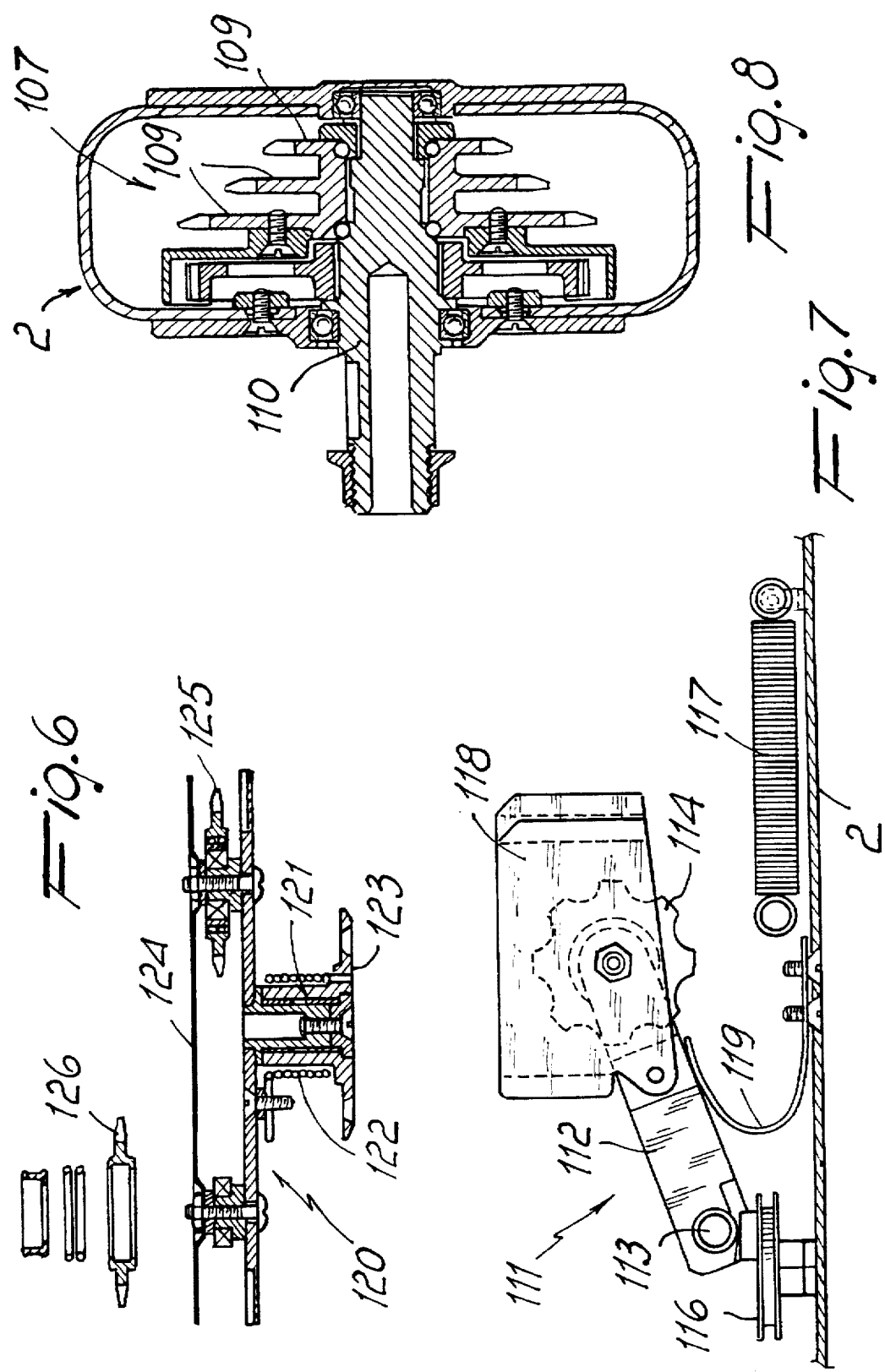

5,730,670

BICYCLE TRANSMISSION ASSEMBLY

BACKGROUND OF THE INVENTION

The present invention relates to a transmission assembly, particularly for bicycles and the like.

A very important problem affecting folding bicycles and generally compact bicycles is the fact of providing a system for transferring the motion from the pedal cranks to the rear wheel that is as efficient as a conventional system but is compact at the same time.

A drawback of the systems proposed so far is that they do not provide a performance that is similar to that of a normal bicycle, making it much more tiring to use compact or folding bicycles.

SUMMARY OF THE INVENTION

A principal aim of the present invention is to provide a transmission assembly that solves such problems.

Within the scope of this aim, an object of the invention is to provide a transmission assembly that is particularly compact and light.

Another object is to provide a transmission assembly that is absolutely reliable.

This aim, these objects, and others that will become apparent hereinafter are achieved by a transmission assembly, particularly for bicycles or the like, characterized in that it comprises, inside a box-like body: a first chain ring associated with a pedal crank shaft and connected to a pinion by means of a first chain; a second chain ring associated with a second shaft and rotating rigidly with said pinion; a second chain, associated with said second chain ring and adapted to transmit the motion to a gearshift assembly constituted by a plurality of gears that can be selectively associated with said second chain, said gearshift assembly being rigidly coupled to a hub that supports a wheel in a cantilevered manner outside said box-like body.

BRIEF DESCRIPTION OF THE DRAWINGS

Further characteristics and advantages of the invention will become apparent from the following detailed description of a preferred but not exclusive embodiment thereof, illustrated only by way of non-limitative example in the accompanying drawings, wherein:

FIG. 4 is a sectional top view, taken along a longitudinal plane, of the member of FIG. 1;

FIG. 5 is an enlarged-scale perspective view of the chain tensioner lever;

FIG. 6 is a partially exploded sectional top view of the chain tensioner lever;

FIG. 7 is a lateral elevation view of the derailleur;

FIG. 8 is a sectional rear view of the gearshift assembly.

DESCRIPTION OF THE PREFERRED EMBODIMENTS

Figure 1:
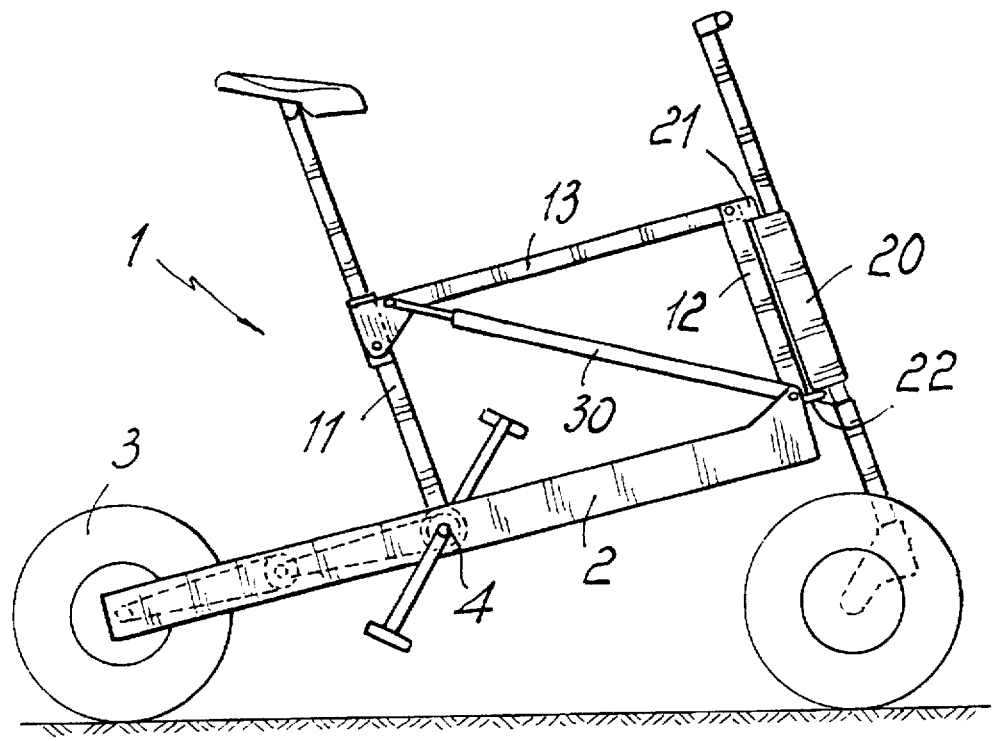
FIG. 1 is a lateral elevation view of a folding bicycle in operating position, provided with the telescopic element according to the invention.

With reference to the above figures, a folding bicycle, generally designated by the reference numeral 1, comprises a frame constituted by a lower member 2 that rotatably supports a rear wheel 3 at its rear end. The pedal crank shaft 4 is rotatably supported in a median position. A saddle post, designated by the reference numeral 11, is pivoted to the lower member 2 at the coupling axis of the pedal crank shaft, and a handlebar post 12 is pivoted at the front end of the member 2. The posts 11 and 12 run substantially parallel to each other and are joined by an upper member 13 that is pivoted to the end of the posts 11 and 12.

The handlebar post 12 constitutes a supporting element for a head tube 20 that is articulated to the raised portions 21 and 22 formed at the ends of the post 12.

In order to lock the frame in the desired position, a telescopic element 30 is provided, which can be arranged at a diagonal of the articulated parallelogram.

Figure 2:
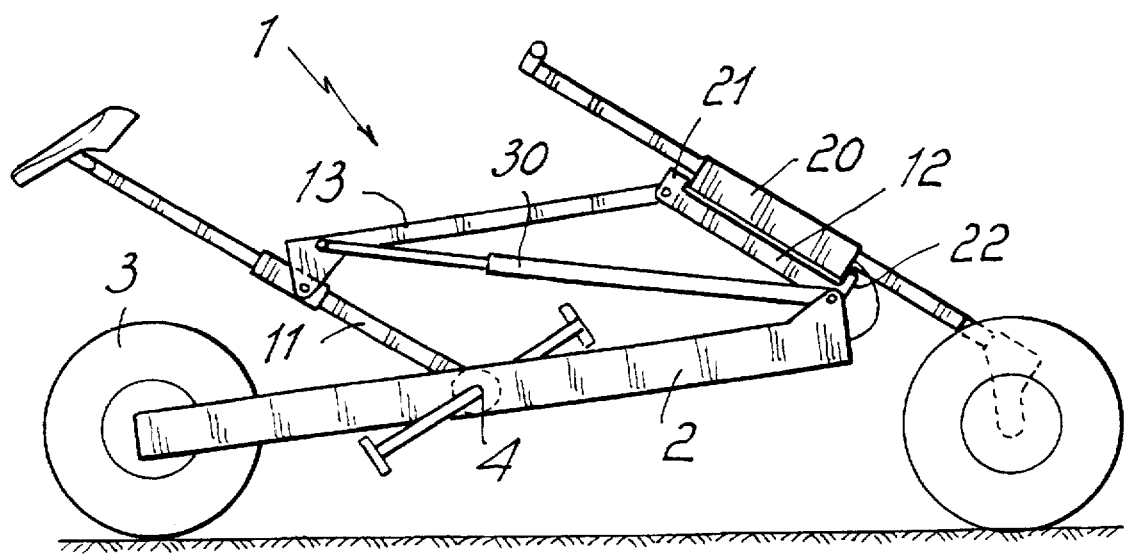
FIG. 2 is a view similar to the preceding one but taken in an almost-folded position.

As shown in FIG. 2, the bicycle is folded very simply: after releasing the telescopic element 30, folding occurs, in practice, by turning the saddle post towards the rear wheel 3.

According to the invention, there is provided an extremely compact transmission assembly which can be inserted, for example, in the lower member 2, constituted by hollow longitudinally extending a box-like body 101 that supports the pedal crank shaft 4. In particular, as it will become more clear hereinafter, the components of the compact transmission assembly are arranged inside the walls of the hollow box-like body. The shaft 4 supports a first chain ring 102 that is connected, by a first chain 103, to a pinion 104 that is keyed on a secondary shaft 105 together with a second chain ring 106.

The second chain ring 106 is kinematically connected to a gearshift assembly 107 by means of a second chain 108. The gearshift assembly 107 comprises a plurality of coaxial gears 109 having different diameters, in a per se known manner, which are mounted on a hub 110 that supports the rear wheel 3 in a cantilevered manner outside the box-like body 101.

The chain furthermore engages a derailleur 111 adapted to shift said chain onto one of the selected gears 109 to shift gears.

The derailleur 111 comprises a lever 112 that is pivoted to a transverse shaft 113 at one end and supports a pulley 114 at the other end. The lever 112 is also movable transversely on the shaft 113 through the motion of the pulley 116, which is actuated by an actuation cable 115 that is wound on the pulley 116 and fixed to a spring 117. The pulley 114 furthermore comprises a guide 118 adapted to prevent the chain 108 from slipping off said pulley and which keeps the chain 108 tensioned through the action of a spring 119.

The transmission assembly furthermore comprises a lever 120 that is adapted to adjust the tension of the chain 108; said lever is rotatably fixed to a fixed pivot 121 having a contrast torsion spring 122. The fixed pivot 121 comprises a flange 123 adapted to be fixed outside the wall of the box-like body 101. Advantageously, the box-like body 101 comprises, for this purpose, four or six holes arranged so as to adjust the angular position of the flange 123 and, therefore, the torsion of the spring 122 and accordingly the tension applied by the lever to the chain. The lever furthermore comprises a wall 124 adapted to prevent the chain 108 guided on the pulleys 125 and 126 of said lever from slipping off.

Figure 3:
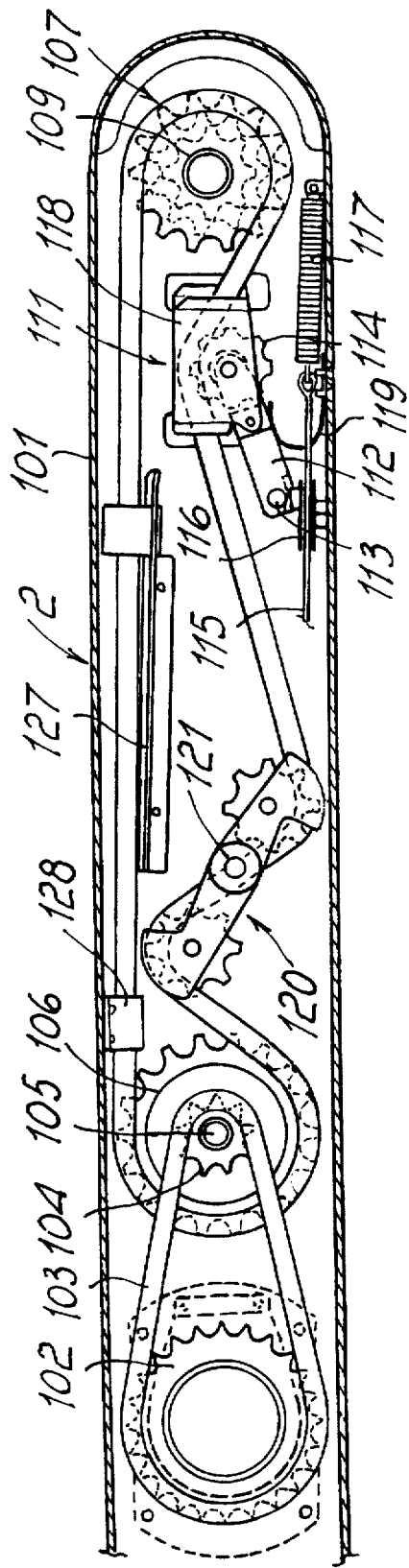
FIG. 3 is a sectional lateral elevation view, taken along a longitudinal plane, of the lower member with the transmission assembly according to the invention.

Advantageously, the chain 108 is also guided, in the upper horizontal portion with reference to FIG. 3, by a longitudinal guide 127, preferably made of nylon, and by a U-shaped guide 128, so as to make chain slip-off impossible.

In practice it has been observed that the transmission assembly according to the invention achieves the intended aim and objects, providing a compact and extremely functional assembly.

An important advantage of the invention is the fact that the transmission chain cannot in any way slip off the chain rings.

The device according to the invention is susceptible of numerous modifications and variations, all of which are within the scope of the inventive concept; furthermore, all the details may be replaced with technically equivalent elements.

The materials employed, as well as the dimensions, may of course be any according to the requirements and the state of the art.

What is claimed is:

1. A transmission assembly in combination with a bicycle, said bicycle comprising a lower frame member in the form of a longitudinally extending internally hollow box-like body with walls, said transmission assembly comprising:
    a first chain ring associated with a pedal crank shaft and connected to a pinion by means of a first chain, said pedal crank shaft being rotatably supported by said box-like body;
    a second chain ring associated with a second shaft and rotating rigidly with said pinion, said second shaft being supported by said box-like body;
    a second chain associated with said second chain ring and adapted to transmit the motion to a gearshift assembly constituted by a plurality of gears that can be selectively associated with said second chain by a derailleur, said gearshift assembly being rigidly coupled to a hub that supports a wheel in a cantilevered manner outside said box-like body;
    the components of the transmission assembly including said chain rings, said chains, said pinion, said plurality of gears, and said derailleur all being arranged inside the walls of said internally hollow box-like body.

2. The combination of claim 1, further comprising guiding means arranged inside said walls of said internally hollow box-like body for guiding said chains and preventing said chains from slipping off the respective gears and chain rings.

3. The combination of claim 1, wherein said derailleur comprises a lever that is pivoted to a transverse shaft at one end and supports a first pulley at its other end, said transverse shaft extending inside said box-like transversely with respect to the longitudinal extension of said box-like body, and said lever being pivoted to said transverse shaft about an axis extending substantially parallel to the extension of said transverse shaft, said lever being movable on said shaft through the action of an actuation cable that is wound around a second pulley and is fixed to a contrast spring which is in turn fixed to said box-like body.

4. The combination of claim 3, wherein said first pulley comprises a guide adapted to prevent said second chain from slipping off said first pulley and an elastic element acting between said box-like body and said lever to keep said chain under tension.

5. The combination of claim 1, comprising a lever that is pivoted inside said box-like body and comprises pulley means for guiding said second chain and keeping said second chain at a preset tension.

6. The combination of claim 5, wherein the angular torque applied to said lever with respect to said box-like body is adjustable to vary said tension applied to said second chain by means of a contrast torsion spring which biases said spring and which is adjustably connected in one of a plurality of angular positions to said box-like body.

7. The combination of claim 1 wherein said bicycle is a folding bicycle and said lower frame member is a portion of a collapsible frame of said folding bicycle.

8. The combination of claim 7 wherein said derailleur comprises a lever that is pivoted to a transverse shaft at one end and supports a first pulley at its other end, said transverse shaft extending inside said box-like transversely with respect to the longitudinal extension of said box-like body, and said lever being pivoted to said transverse shaft about an axis extending substantially parallel to the extension of said transverse shaft, said lever being movable on said shaft through the action of an actuation cable that is wound around a second pulley and is fixed to a contrast spring which is in turn fixed to said box-like body, and wherein the combination further comprises a lever element that is pivoted inside said box-like body and comprises pulley means for guiding said second chain and keeping said second chain at a preset tension.

9. The combination of claim 8 wherein said first pulley comprises a guide adapted to prevent said second chain from slipping off said first pulley and an elastic element acting between said box-like body and said lever to keep said chain under tension, and wherein the angular torque applied to said lever element with respect to said box-like body is adjustable to vary said tension applied to said second chain by means of a contrast torsion spring which biases said spring and which is adjustably connected in one of a plurality of angular positions to said box-like body.

10. The combination of claim 9, further comprising guiding means arranged inside said walls of said internally hollow box-like body for guiding said chains and preventing said chains from slipping off the respective gears and chain rings.

* * * * *